Patented Nov. 15, 1927.

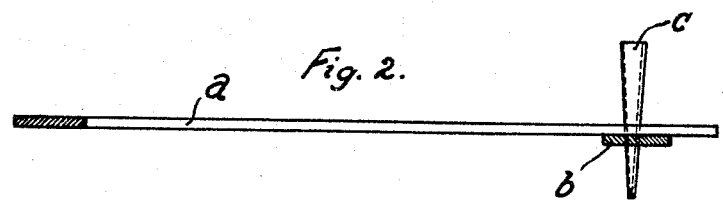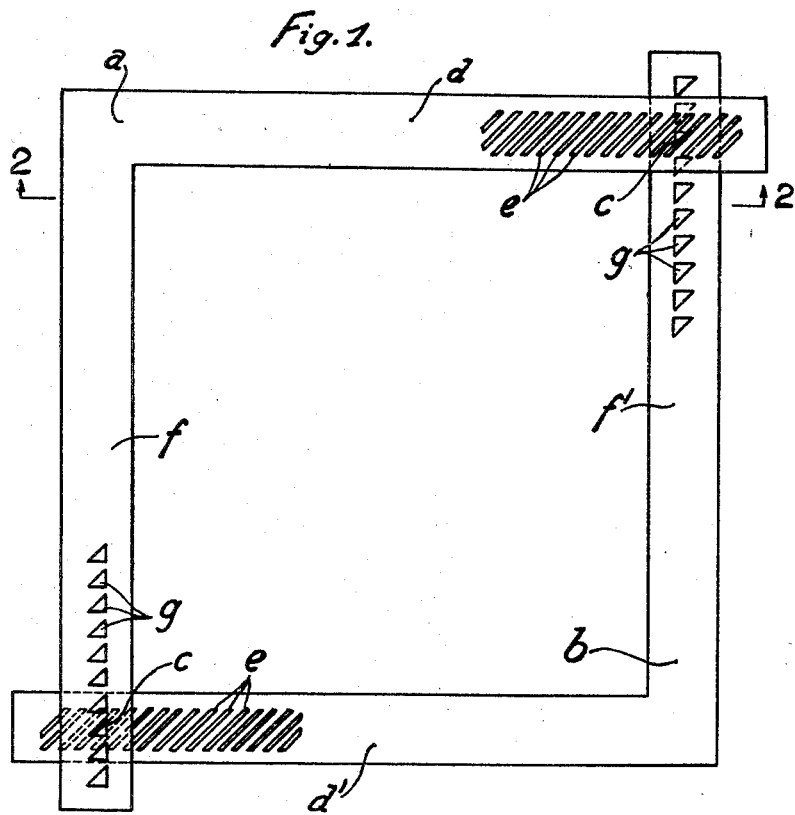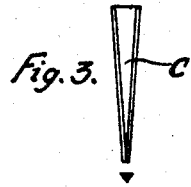

1,649,015

UNITED STATES PATENT OFFICE.

HANS BRAUN, OF ZURICH, SWITZERLAND.

CLAMP.

Application filed December 23, 1926, Serial No. 156,739, and in Switzerland December 31, 1925.

This invention relates to a clamp, particularly for holding the shuttering employed in the erection of concrete columns and the like, and consists in the provision of two right-angled overlapping members each of which has one arm formed with diagonal slits and the other with triangular apertures arranged so that wedges inserted through coinciding slits and apertures tend to force the members together.

Fig. 1 of the accompanying drawings represents a plan of the device,

Fig. 2, a cross-section on the line 2—2 of Fig. 1, and

Fig. 3, views showing the shape and cross-section of the wedge.

The device is composed of two right-angled members $a$ and $b$ adapted, when placed in an overlapping position as shown in Fig. 1, to embrace the shuttering of a concrete column or any other suitable object, and to be clamped to the same by means of wedges $c$. For the reception of the wedges, the arms $d$ and $d'$ of the members are formed with diagonal, closely set slits $e$, and the arms $f$ and $f'$, with triangular apertures $g$ which are placed with their hypotenuses in alignment with the slits $e$. The bands of slits on the arms $d$, $d'$ are wide enough to cover two apertures on the arms $f$, $f'$, and coinciding slits and apertures must therefore occur in every overlapping position of the two members. Coinciding slits and apertures form a more or less long trapezoidal gateway through which the wedges $c$ can be inserted, and as the latter are forced down, the frame formed by the two members will be contracted in a diagonal direction.

The wedges are preferably made of trapezoidal cross-section in conformity with the shape of the gateways.

I claim:

1. A clamp comprising two right-angled overlapping members each of which has one arm formed with diagonal slits and the other with triangular apertures, and wedges adapted to enter coinciding slits and apertures of said members so as to contract the enclosed space.

2. A clamp according to claim 1 wherein the triangular apertures have their hypotenuses in alignment with the slits of the opposite member.

3. A device according to claim 1 wherein the wedges are of trapezoidal cross-section.

4. A clamp according to claim 1 wherein the slits are arranged close together and made long enough to span the space occupied by two apertures.

HANS BRAUN.